May 28, 1963     A. J. MOSES ETAL     3,091,303
WEIGHING SYSTEMS OF LOAD-CELL ELECTRONIC
TYPE WITH VIBRATION DAMPENING MEANS
Filed Nov. 17, 1958     5 Sheets-Sheet 1

INVENTORS
Amaziah J. Moses
G. Boyd Scanland

BY    C. F. Bryant
ATTORNEY

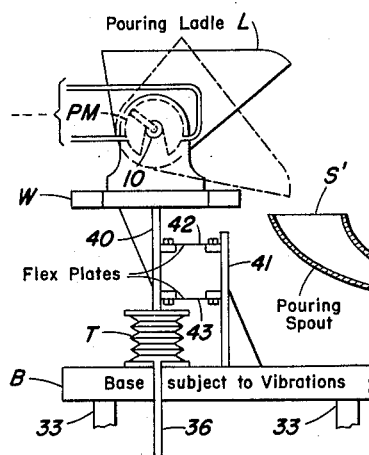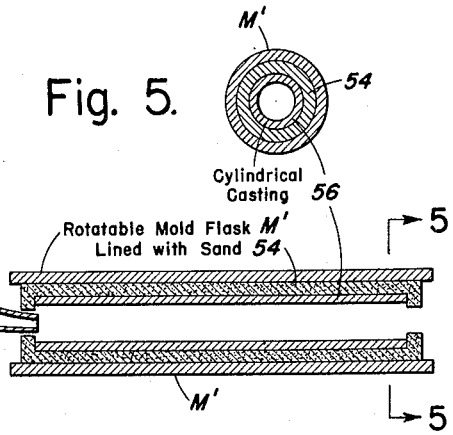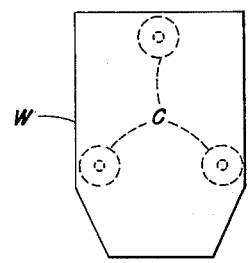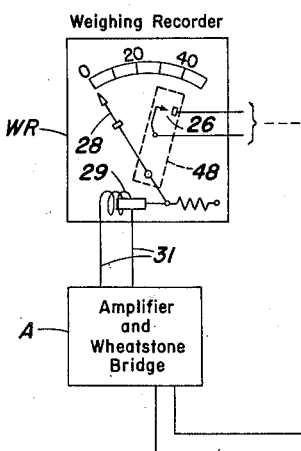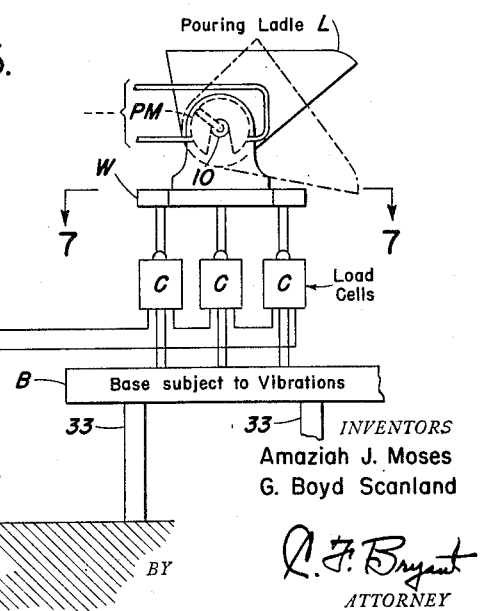

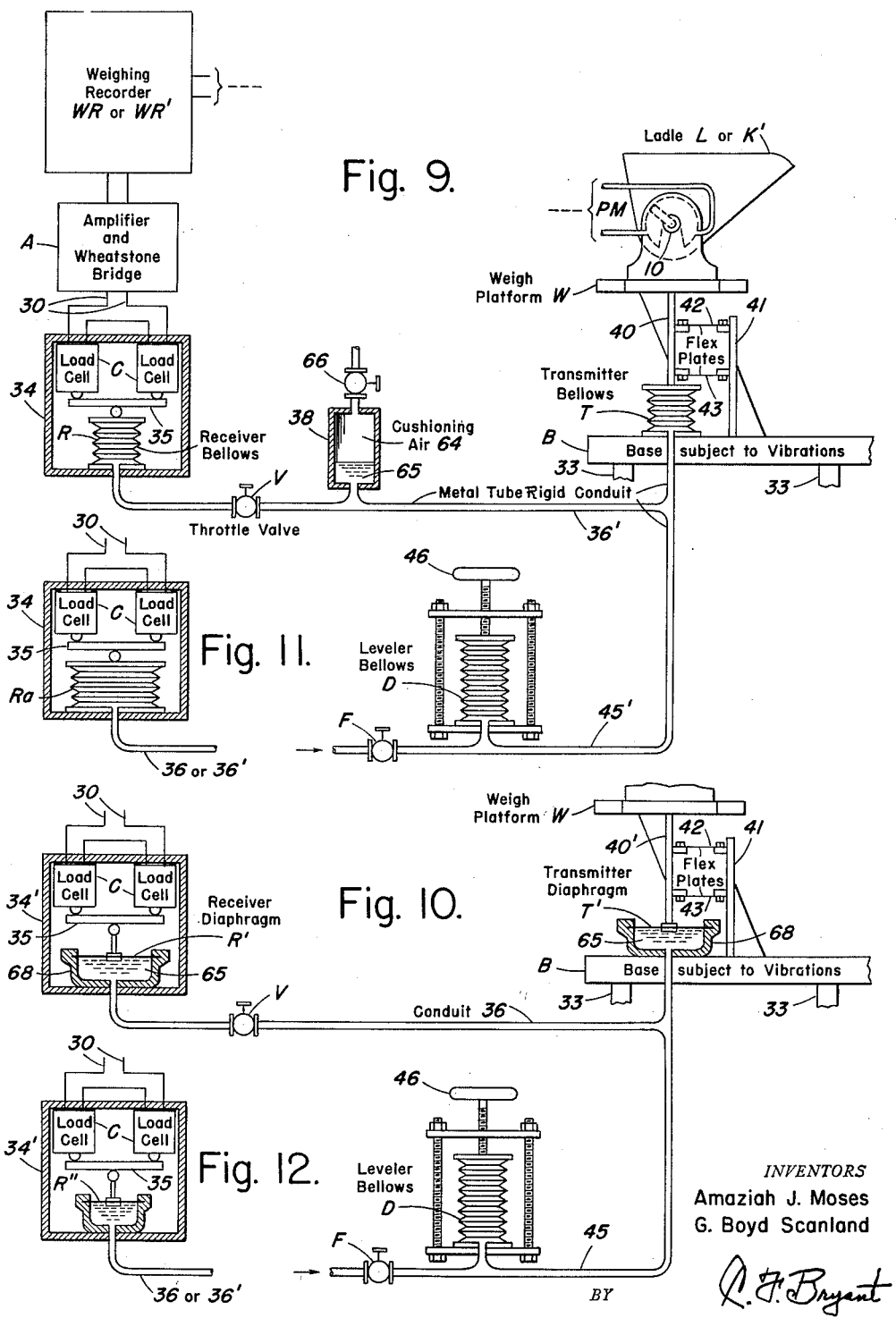

INVENTORS
Amaziah J. Moses
G. Boyd Scanland

ATTORNEY

United States Patent Office 3,091,303
Patented May 28, 1963

3,091,303
WEIGHING SYSTEMS OF LOAD-CELL ELECTRONIC TYPE WITH VIBRATION DAMPENING MEANS
Amaziah J. Moses, Lookout Mountain, and Granville B. Scanland, Signal Mountain, Tenn., assignors, by mesne assignments, to United States Pipe and Foundry Company, Birmingham, Ala., a corporation of New Jersey
Filed Nov. 17, 1958, Ser. No. 775,674
10 Claims. (Cl. 177—208)

Our invention relates to weighing systems of the type wherein gravitational force produced by the load being weighed acts upon one or more strain gauges or load cells which convert that force into an electrical signal that is amplified and fed into an instrument which indicates the weight of said load by responding to the strength of said amplified signal, and it has particular reference to such load-cell type weighing systems when employed under especially challenging conditions including those wherein the support base for the weigh platform is subject to disturbing vibrations of substantial intensity.

Generally stated, the object of our invention is to improve such load-cell electronic type weighing systems in a unique way which broadens their usefulness and extends their adaptability and reliability.

A more specific object is to provide such load-cell type weighing systems with novel vibration dampening means which are effective to prevent vibrations present either in the support base or in the weigh platform from interfering with the accuracy and reliability of the weight indication that is derived from the load cell output signal.

Another object is to isolate mechanical vibrations in the weighing system elements from the load-cell signal via simple and inexpensive dampening means which may readily be applied to existing installations as well as to new ones.

A further object is to provide vibration dampening means of the aforesaid novel variety which impart especial benefit to load-cell electronic type weighing systems that are installed in foundries for accurately weighing charges of molten metal prior to the pouring of same into molds incident to the production of metal castings.

A still further object is to enable the load cells of such foundry metal weighing systems to be installed in a clean and accessible location that is physically separate from the hot and unprotected location of the system weigh platform and support base.

An additional object is to supplement and reorganize load-cell electronic weighing systems in a novel way which facilitates remote operation control while also permitting the applied load more readily to be multiplied or divided and further permitting composite loads more readily to be summarized either additively or subtractively.

A related important object is to mount the weigh platform W of vibration-dampened (FIGS. 1–2–3, 4, 8, 9, 10 hereof) and other (FIGS. 6–7 hereof) load-cell type systems in a new and improved manner which assures that the platform supporting parts will function reliably and dependably over months and years of operating time without shut down or trouble of any kind even in challenging environments such as the illustrated foundry weighing where dirt and molten metal and other adverse factors are regularly encountered.

Other objects and advantages will become apparent as the disclosure and description hereof proceeds.

In practicing our invention we accomplish the foregoing by physically removing the load cells from their conventional positioning between the weigh platform and support base and transmitting the weight-proportional mechanical force thereto via a novel hydraulic system which utilizes a transmitter bellows or diaphragm that is acted upon by the weigh platform together with a communicating receiver bellows or diaphragm that impresses upon the remotely located load cells a mechanical force that duplicates (or is proportional to) the gravitational force exerted by the weigh platform but from which all objectionable vibrations present in the support base and weigh platform have been damped out by cushioning means in the hydraulic system. Because of such dampening the electrical signal produced by the load cells is no longer adversely affected by vibrations in the support base and weigh platform and such signal when amplified now can produce a weight indication which at all times is accurately representative of the weight being applied to the transmitter bellows or diaphragm; and this is true even though the support base and weigh platform are subjected to vibrations of a high magnitude.

Load-cell type weighing systems when improved and reorganized to incorporate these novel vibration dampening means not only become immune to disturbing vibrations but their overall usefulness also is broadened in other significant respects as indicated by the foregoing objects and as will further be made apparent by later description herein.

Illustrative equipment provided by us for practicing this invention is disclosed by the accompanying drawings wherein:

FIG. 1 diagrammatically represents a load-cell electronic type system which is organized to weigh charges of molten metal prior to the pouring thereof into foundry molds and into which system the vibration dampening improvements of our invention have been incorporated for the purpose of making the weight-indicating electrical signal from the load cells immune to any and all vibrations to which the support base and weigh platform elements of the system are subjected;

Figure 3:
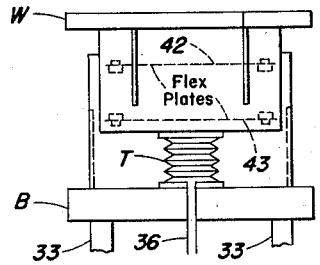
FIG. 3 is a view on line 3—3 of FIG. 1 showing how the aforesaid pouring ladle weigh platform and transmitter bellows and support base appear when viewed from the left side.
Figure 2:
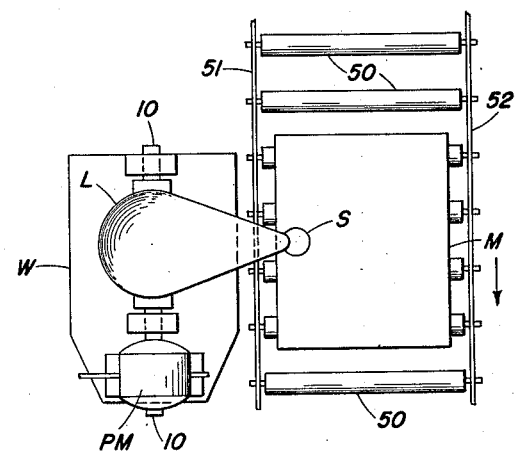
FIG. 2 is a plan view taken on line 2—2 of FIG. 1 showing how the pouring ladle and mold conveyor portions of that illustrative FIG. 1 apparatus appear when viewed from the top.
Figure 1:
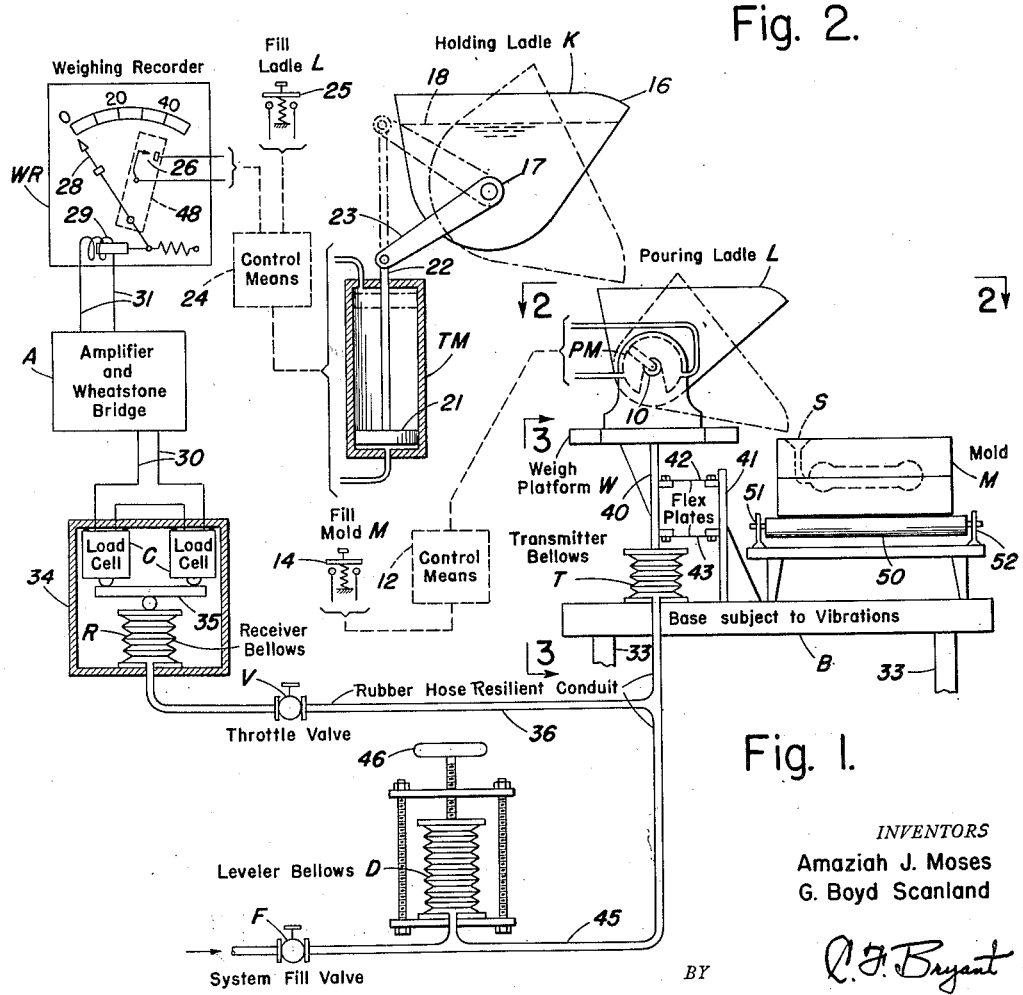
Figure 8:
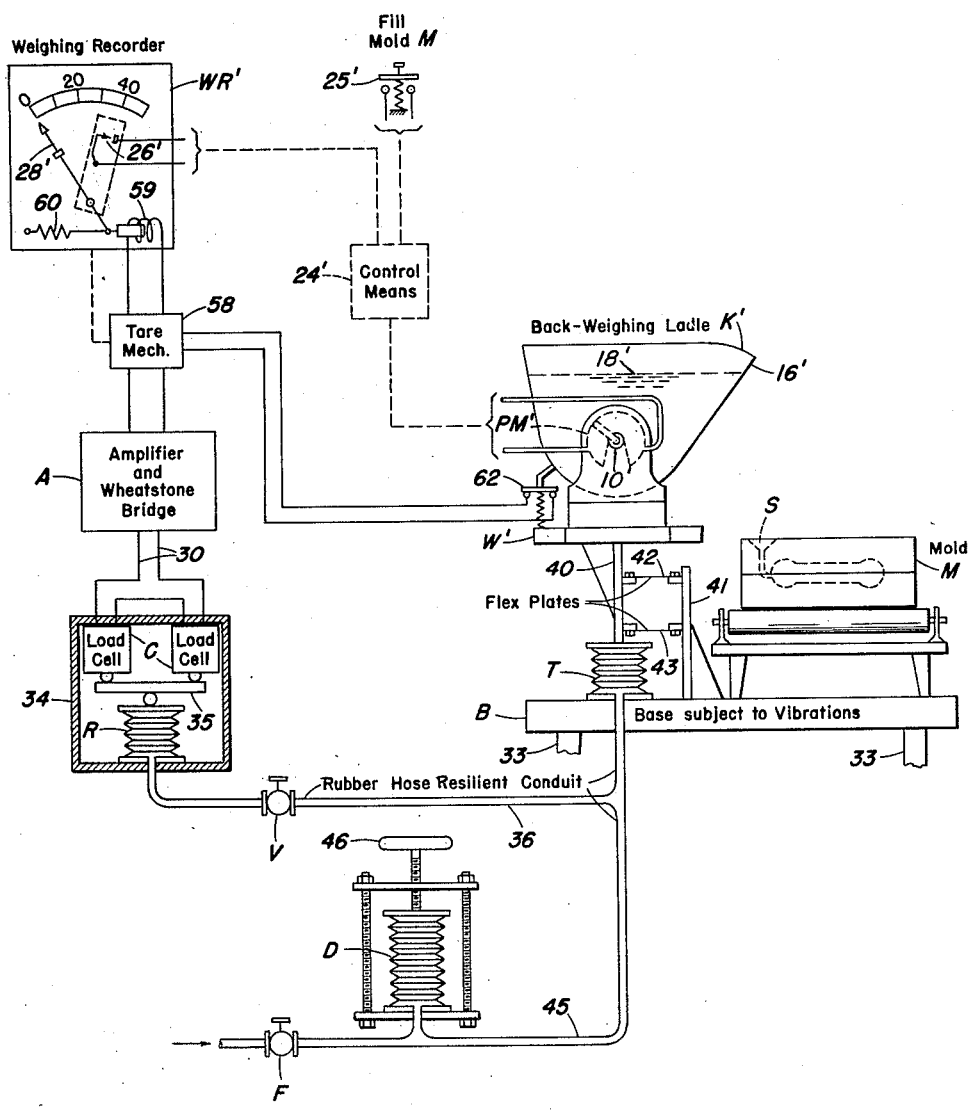
Figure 13:
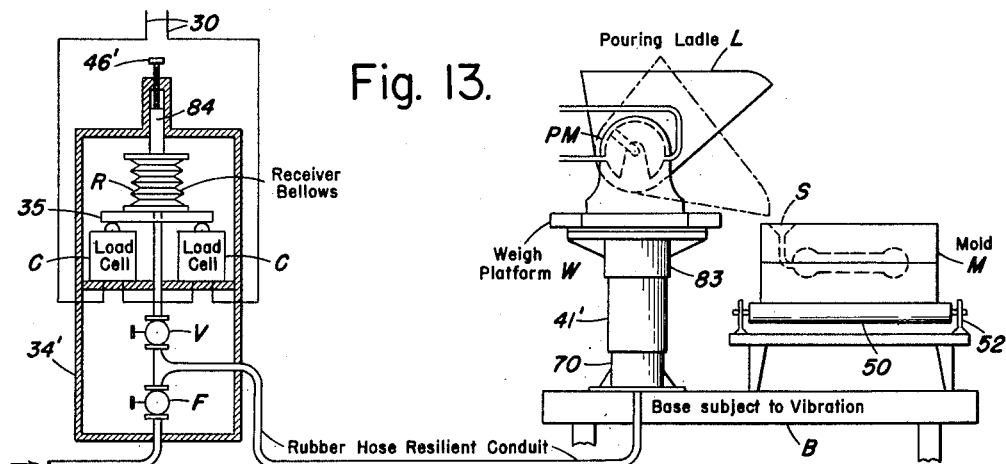
Figure 14:
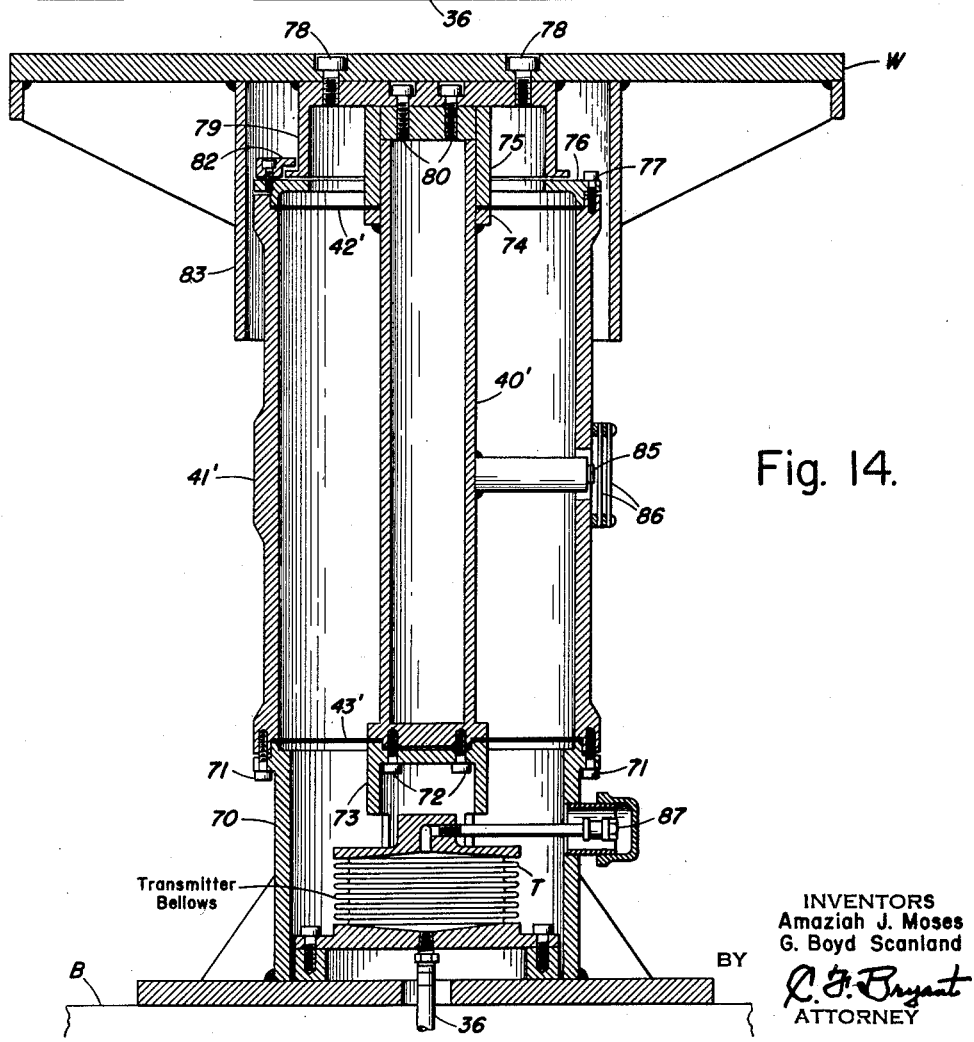

FIG. 4 indicates how the pouring ladle facilities of FIGS. 1–2–3 may be organized for pouring the weighed molten metal into a rotatable mold that is employed for the centrifugal production of cylindrical castings;

FIG. 5 is a section on line 5—5 of FIG. 4 through said rotatable mold and the cylindrical casting there represented;

FIG. 6 is a diagram showing how load cells corresponding to those used in our improved electronic weighing system of FIGS. 1 and 4 have in the past been placed directly between the weigh platform and support base with resultant inaccurate and unsatisfactory indication of the supported weight when said support base and platform are subjected to vibrations;

FIG. 7 is a view on line 7—7 of FIG. 6 showing how the load cells of that prior art arrangement are positioned to provide a three-point support;

FIG. 8 is a diagram generally similar to FIG. 1 but differing therefrom in that it shows the vibration dampening means of our invention applied to a load-cell electronic type of weighing system which operates on the "back" weighing principle instead of on the "forward" weighing principle of FIG. 1;

FIG. 9 shows how in the systems of FIGS. 1 and 8 the resilient rubber-hose conduit which interconnects the transmitter and receiver bellows may if desired be replaced by an unyielding metal-tube conduit plus an air filled accumulator for vibration absorption;

FIG. 10 indicates how the hydraulic transmitter and receiver bellows of FIGS. 1, 3, 4, 8 and 9 may if desired be replaced by hydraulic diaphragm devices which perform the same functions and operate in the same way;

FIG. 11 illustrates how the load applied to the weigh platform of any of the systems here shown can be multiplied at the point of indication by equipping the system load cells with a receiver bellows (or diaphragm) which is larger than the transmitter bellows (or diaphragm) beneath the weigh platform;

FIG. 12 similarly shows how the platform-applied load in any of the systems here disclosed can be divided at the indicating instrument by equipping the system load cells with a receiver diaphragm (or bellows) which is smaller than the transmitter diaphragm (or bellows) at the weigh platform location;

FIG. 13 is a diagram generally similar to FIG. 1 but differing therefrom in that it shows new and improved facilities for mounting and supporting the weigh platform W of each of FIGS. 1-2-3, 4, 6-7, 8, 9 and 10, and also in that it shows alternate means at the location of receiver bellows R for adjusting the level of platform W without need for leveler bellows such as D of FIGS. 1, 8, 9 and 10; and FIG. 14 is an enlarged illustration of the improved weigh platform mount of FIG. 13 with parts cut away to reveal how upper and lower flexible diaphragms are housed therein along with the weighing system transmitter bellows T.

*Illustrative Weighing System To Be Benefitted*

In the diagram of FIG. 1 the vibration dampening improvements of our invention are illustratively shown as being incorporated into a load-cell electronic type of weighing system that is organized to weigh charges of molten metal before same are poured into the sprue openings S of foundry molds M (of static or any other type) which successively are brought into receiving relation with a pouring ladle L. That pouring ladle L receives measured quantities of molten metal from a main holding ladle K; it is carried by a shaft 10 which normally holds it in the level or upright position indicated; but it also can be tilted forwardly, as by a vane-type hydraulic motor PM governed by suitable control means 12 including a push button 14, for the purpose of pouring its measured contents into the mold M when in front thereof or otherwise in receiving relation therewith.

The above mentioned main holding ladle K has a spout 16 and is carried by side trunnions 17 (only one shown) which support it in the represented position wherein spout 16 is aligned over the pouring ladle L. This holding ladle K is dimensioned to contain a substantial supply, such as 500 pounds, of the molten metal 18 that is to be weighed and poured. Such molten metal as drawn from the cupola furnace (not shown) of the foundry installation can be delivered to ladle K in any suitable manner. Thus an overhead monorail car (also not shown) may if desired be utilized to refill the ladle K with molten metal at suitable intervals.

Such ladle K normally occupies the level or upright position indicated. However, at proper times forwardly tilting movement is imparted thereto by suitable means here shown as including trunnions 17 plus a cylinder-type hydraulic motor TM having a piston 21 that is linked to one of said trunnions 17 via rod 22 and tilting arm 23. This cylinder-type motor TM is driven by hydraulic fluid under the governing influence of control means 24 which cause ladle K to be tilted forwardly when push button 25 is depressed and which stop that forward tilting and return the ladle K to its represented level position upon the closure of contacts 26 in a weighing recorder WR.

In the illustrative weighing system disclosed by FIG. 1 the pointer 28 of said recorder instrument WR indicates the weight of the molten metal 18 which the pouring ladle L receives from the holding ladle K. This is accomplished by placing one or more load cells C (sometimes designated as strain gauges) under a mechanical force equal to the weight of pouring ladle L with contents (plus pouring motor PM) as carried by the weigh platform W, by feeding the electrical output signal from those load cells C into Wheatstone bridge and amplifier circuits A which strengthen and intensify that signal, and by applying such amplified signal to the pointer actuating winding 29 of said weighing recorder WR.

The mentioned load cells or strain gauges C have the characteristic of changing their electrical resistance with changes in the weight or other mechanical force applied thereto, and of in this way providing the weight-proportional electrical signal referred to above which conductors 30 feed into bridge-amplifier circuits A and which in amplified form is then fed via conductors 31 into the instrument WR. In the illustrative weighing system shown by FIG. 1 that instrument WR is adjusted so that when pouring ladle L is empty the pointer 28 thereof will stand at zero.

*Past Load Cell Location and Disadvantages*

Prior practice has been to position the load cells C physically between the weigh platform W and the support base B therebeneath, as in the way represented by FIGS. 6–7, so that the entire weight of said platform W (including motor PM plus ladle L with contents) is directly carried by those load cells C. This past arrangement is workable in situations where the support base B and weigh platform W are not subjected to vibrations or other disturbing influences; and under such favorable circumstances weighing recorder WR of FIG. 6 can give via pointer 28 a dependable indication of the weight of molten metal which ladle L receives, as from the holding ladle shown at K in FIG. 1.

In attempting to utilize a weighing system of this FIGS. 6–7 type in an actual foundry installation we have found that when support base B is subjected to vibrations the output signal applied to conductors 30 by the load cells C of FIG. 6 is so distorted by those vibrations that instrument WR can no longer accurately indicate the weight of molten metal which ladle L receives; and due to the disturbing influence of such vibrations pointer 28 then will behave in an erratic and thoroughly unreliable manner and show a weight that is substantially different (sometimes less and sometimes greater) than the actual quantity of metal in ladle L.

In foundry installations of the type dealt with by us the troublesome vibrations referred to above are created by all moving equipment in the foundry and are of many frequencies and magnitudes. Special offenders are conveyors for handling sand and for handling castings, which conveyors depend on vibration to move their materials; also air compressors and various other machines which are dynamically unbalanced. All such dynamically unbalanced devices and other sources of vibration are generally designated at 32 in FIG. 6.

In one foundry with which we have been concerned, the vibrations from these various sources 32 have been found to transmit themselves through the ground 20 (in this respect clay compositions behave like solid rock) and building foundation and structural members 33 to the weighing system base B. Moreover, these vibrations from the several individual sources 32 as thus transmitted to base B further are found to have assorted frequencies which combine with and supplement each other in an additive way that produces recurring "beats" of an intensity substantially higher than any of the component individual vibrations; and their effect is to render substantially useless the here considered load-cell type system for weighing molten metal when the load cells C thereof are located and organized in the prior art manner typified by FIGS. 6–7. This is all the more understandable when it is considered that such load cells C go from zero to full capacity with a compression of the exceedingly small value of from about 0.005 to about 0.015 inch; hence in a system of the FIG. 6 type the least vertical motion induced in the load cells by vibrations present in the base B (or the weigh platform W) is disastrous to accurate weighing.

*Initial Attempts To Solve Problem*

In seeking for a solution of the above problem we initially considered either isolating from the ground foundation 20 of the foundry the vibrations of each individual piece of moving equipment 32, or isolating the FIG. 6 weighing base B and platform W from the many frequencies of vibrations created by all such moving equipment in the foundry. It soon became apparent that the first approach would be prohibitively expensive and probably impossible. In the face of such conclusion intensive effort was directed to the second approach. Here too there were encountered practical difficulties which soon revealed that the desired answer could not be gotten through isolation of the weighing system elements B and W from the many foundry vibrations which reach them via transmission thereto through the ground and foundation 20 and structural support members 33.

As experiment after experiment failed this vibration isolation problem took on the frustrating aspects of one possibly without a practical solution of any kind.

*Our Novel Vibration Dampening Means*

It was at this point that we conceived and tried and perfected the novel vibration dampening means which are disclosed herein and which have solved the foregoing problem in a way that is unexpectedly satisfactory (vibration experts and consultants initially doubted the workability of our invention) as well as being extremely inexpensive and simple and reliable.

In accordance with the invention embodiment depicted by FIG. 1 the load cells or strain gauges C of the weighing system are removed from their conventional positioning between the weigh platform W and the support base B and are installed at some other location where these load cells C are placed within a suitable mounting frame such as shown at 34; and the weight-proportional mechanical force is transmitted to these relocated load cells C via a novel hydraulic system which is filled with oil or other fluid and which utilizes a transmitter bellows T (or diaphragm T' of FIG. 10) together with a matching receiver bellows R (or diaphragm R' of FIG. 10) that is interconnected with bellows T by means of a rubber hose or other conduit 36 somewhat resilient to pressure and the contained hydraulic fluid. Said bellows T (or diaphragm T') directly supports the weigh platform W while said bellows R (or diaphragm R') impresses upon said load cells C via bar 35 a mechanical force which duplicates the gravitational force exerted by platform W upon bellows T (or diaphragm T') but from which all objectionable vibrations present in the support base B and the weigh platform W have been effectively dampened out by the resilience of conduit 36 in the fluid system.

The resilience needed to achieve this vibration dampening also may be provided as per FIG. 9 where a rigid metal-tube conduit 36' has an air filled accumulator 38 connected therewith, as later described more fully. Moreover, each such conduit 36 and 36' between transmitter and receiver units T and R preferably has included therein a throttle valve V or equivalent (such as a hose clamp not shown) which limits the speed of fluid flow through the conduit and thereby prevents shocks to the weigh platform W from overloading the load cells C while also minimizing hunting or over shooting of pressure changes in the hydraulic system.

In order to keep the weigh platform W properly aligned over the transmitter bellows T (and over diaphragm T' of FIG. 10) and the associated support base B, use may be made of any suitable mounting arrangement. In the elementary simplified form illustrated in FIGS. 1–3 such mounting includes a braced member 40 that extends downwardly from platform W and rests upon the top of bellows T; a second braced member 41 that extends upwardly from the base B and that is spaced to the right of member 40 as shown; and upper and lower flex plates 42 and 43 that extend horizontally between said base member 41 and the platform member 40 at the left thereof. These represented flexible mounting means serve to keep the weigh platform W properly aligned with respect to its support base B while at the same time leaving the platform free to move up and down with the top of bellows T upon which support 40 rests. This action is analogous to that of a frictionless hinge.

Other weigh platform mountings capable of doing the same thing are of course possible. A significantly improved design for such mounting which we have perfected and used with outstanding success is illustrated by FIGS. 13–14 later to be described.

Oil or other suitable hydraulic fluid can be filled into the hydraulic system at any suitable point as via valve F shown as being included in branch conduit 45 (45' in FIG. 9). Valve F will be closed once an appropriate quantity of fluid has been received by bellows T and R (or by the FIG. 10 diaphragm devices T' and R') plus their interconnecting conduit 36 (36' in FIG. 9).

Further provided in the systems of FIGS. 1–4 and 8–10 is a leveler bellows D communicating with conduits 45 and 36 (45' and 36' in FIG. 9) in the manner shown. With a given amount of fluid in the hydraulic system this bellows D can through turning of hand wheel 46 be utilized to adjust the quantity of fluid in conduit 36 (or 36') plus bellows R and T (or diaphragm devices T' and R') and thereby set the top of bellows T (or the diaphragm T') to that desired position wherein the flex plates 42 and 43 are substantially horizontal. In the system of our FIG. 13 the same leveling function is accomplished in a simplified way later to be described.

*How Vibration Dampened Weighing System of FIG. 1 Operates*

In our vibration dampened weighing system of FIG. 1 the receiver bellows R are of the same size as transmitter bellows T; and load cells C in frame 34 thus receive from bellows R a mechanical force accurately duplicating the gravitational force applied to transmitter bellows T by weigh platform W.

In consequence the weighing recorder WR of FIG. 1 responds to the amplified output signal from load cells C in the same manner as were those load cells positioned directly beneath the weigh platform W as in the prior art organization of FIG. 6; but with the additional highly vital advantage that any and all vibrations in support base B and in weigh platform W are in our improved organization of FIG. 1 completely dampened out by the hydraulic bellows T and R and their interconnecting fluid within the resilient conduit 36.

So effective is such dampening that in the earlier referred to foundry installation where base B and platform W are subjected to severe vibrations (as received via members 33 and the ground 20 from sources designated 32 in FIG. 6), the FIG. 1 system for weighing molten metal is found to operate with complete satisfaction. More specifically, regardless of the intensity and character of the vibrations to which base B and platform W are subjected weighing recorder WR of the FIG. 1 system reliably and accurately indicates via pointer 28 the weight of molten metal 18 which pouring ladle L receives from holding ladle K.

Said recorder instrument WR is adjusted (as previously mentioned) so that when pouring ladle L is empty the instrument pointer 28 stands at zero. The earlier mentioned contacts 26 of this instrument are mounted on an adjustable support 48 that may be set anywhere along the WR weight scale. In the illustration hereof the setting is such that when pointer 28 registers 30 pounds it will engage and close contacts 26 and acting through control means 24 stop the forward tilting of the holding ladle K and return that ladle K to the upright or level position.

In this way the forward tilting of holding ladle K earlier started by depressing push button 25 is automatically stopped by the FIG. 1 system at the time when pouring ladle L has received the desired predetermined weight (here assumed to be 30 pounds) of molten metal from ladle K. The 30 pound quantity just mentioned is assumed to be the weight of metal needed for filling each of the molds M that are served by the pouring ladle L.

If a lesser quantity is needed for such mold filling the WR contact support 48 can be adjusted to the left into correspondence with that smaller weight setting, while if a larger quantity of mold filling metal is required this WR contact support 48 can be adjusted to the right into correspondence with that larger weight setting. Regardless of whether such weight setting is high or low or intermediate, instrument WR will indicate the selected weight with the dependable accuracy earlier mentioned; and any "spring effects" or resistances present in system elements such as flex plates 42—43 or hydraulic bellows T and R or load cells C do not detract from such uniform accuracy since these are compensated for automatically by the system instrumentation.

Once the desired predetermined quantity (30 pounds or other) of molten metal has been received by pouring ladle L, transfer of such metal into the sprue opening S of mold M is in the FIG. 1 system initiated by depressing push button 14. Such depression causes control means 12 to activate hydraulic motor PM in a way causing shaft 10 forwardly to tilt ladle L with an accompanying emptying of its contents into the mold sprue opening S. Upon reaching the position of maximum tilt limit switch contacts (not shown) associated with ladle L cause control means 12 to reverse motor PM and return the now empty pouring ladle to its upright position.

Mold M now is filled with the measured quantity of molten metal and hence is ready for moving away from the represented position immediately in front of pouring ladle L. In the organization shown by FIGS. 1 and 2 such removal movement is along a conventional conveyor that includes rollers 50 carried by left and right side supports 51 and 52. It may be accomplished either manually or by automatic mechanical means (not shown), as in the direction of the FIG. 2 arrow. A new or empty mold M then can be brought into receiving position in front of the pouring ladle L.

The weighing and pouring system of FIGS. 1–2–3 now is ready for another cycle which exactly duplicates the one already described. That is to say, weighing recorder WR has once more moved its pointer 28 back to zero indicating that pouring ladle L is empty; and to start the second action cycle it is merely necessary to depress the "fill ladle" push button 25. This sets into action a sequence of steps exactly duplicating those already described as imparting to holding ladle K (through control means 24 and tilting motor TM) a forward tilting which pours molten metal 18 via spout 16 into the pouring ladle L. This goes on until a desired predetermined quantity (assumed to be 30 pounds) of such poured metal has been received by ladle L. At this point pointer 28 of weighing recorder WR closes contacts 26 and thereby cause control means 24 to reverse hydraulic motor TM and thus bring holding ladle L back to its upright or level position.

In order now to transfer such measured charge of metal from pouring ladle L into mold M it is only necessary to again depress the "fill mold" push button 14. Acting through control means 12 it then starts the previously described sequence of actions which serve to tilt ladle L with accompanying emptying of its contents into mold M, and thereafter to reposition that ladle upright.

Ladle L Can Serve Molds of Various Types

Our vibration dampening improvements as applied to load-cell electronic type weighing systems in the novel manner disclosed by FIGS. 1–2–3 hereof impart to those systems the capability of satisfactory and thoroughly reliable operation under conditions wherein the system support base B and weigh platform W are subjected to vibrations whose amplitude may be intense, as in the foundry illustration earlier described herein; and whereas our improved organization of FIGS. 1–2–3 does operate successfully in such a vibration-plagued environment, the conventional prior art system of load-cell weighing means depicted in FIGS. 6–7 is totally unsatisfactory for situations of this troublesome character.

In foundry installations where such troublesome vibrations are present the accurate and reliable weighing of molten metal which our invention makes possible is not restricted in its benefits to molds of any particular type or form but may instead be utilized with advantage incident to pouring of the weighed metal into molds of a wide variety of shapes and forms and types including those which both are and are not lined with sand or the like. The conventional static mold depicted at M in FIGS. 1–2 thus is illustrative of only one form of foundry mold which can be benefitted.

In FIG. 4 we have represented another form of foundry mold in connection with which the vibration-dampened weighing system of our invention can be used with great practical advantage. The mold flask there shown at M' is of the rotatable type which is suitable for producing a cylindrical casting 56, such as a length of metal pipe. In the interest of clarity the FIGS. 4–5 representation of this rotatable mold flask M' is in highly simplified schematic form; and no attempt is here made to describe details as to how the sand lining represented at 54 is placed in the outer shell of flask M' in preparation for receiving a weighed charge of molten metal from ladle L.

Instead it will suffice to observe that the molten metal in appropriate quantity is delivered by pouring ladle L into spout S' and is conveyed by that spout into the interior of this mold flask M' and by the rotation thereof is centrifuged inside the sand lining 54 to form a pipe length or other cylindrical casting 56. Rotation of the flask M' at an appropriate speed may be accomplished by any suitable means (not shown); and such rotation is continued until the molten metal has solidified sufficiently to retain its cylindrical shape.

Each cylindrical casting 56 so formed then is ejected from the flask mold M' (by suitable means again not shown) and following such ejection said rotatable flask has introduced therein another lining of sand 54 in readiness for the reception of another charge of molten metal (from ladle L) and for the production therefrom of another cylindrical casting 56.

Castings of such cylindrical type 56 as produced by centrifuging molten metal in a rotatable mold such as M' are particularly sensitive to the quantity of molten metal that is poured into the mold from ladle L via spout S'. If this quantity is less than the predetermined amount desired the wall of casting 56 will be thinner than what is desired or specified and the casting then must be rejected because of insufficient weight. Similarly if too much molten metal is poured into mold M' the resulting casting 56 will have a wall thickness greater than what is needed or desired and the casting then may have to be rejected because of being excessively heavy.

Stated in another way, a mold flask of the rotatable or "centrifugal" type shown at M' in FIGS. 4–5 may be said to have an "unlimited" metal receiving capacity since even after the introduced molten metal has produced the desired casting wall thickness 56 there still is room inside the mold for considerably more molten metal. The final wall thickness of cylindrical casting 56 thus is directly and solely dependent upon selection via the weighing system for pouring ladle L of the proper quantity of molten metal which is received by that ladle before being transferred therefrom via pouring spout S' into the rotatable flask M'.

A load-cell electronic type weighing system which incorporates our novel vibration dampening means in the unique manner shown by FIGS. 1-2-3 is therefore especially needed by foundry installations where cylindrical castings such as 56 are produced by the centrifugal technique in mold flasks of the rotatable type shown at M' in FIGS. 4-5. Such utilization of the complete FIG. 1 system accordingly is intended to be depicted by FIG. 4 even though not all of the FIG. 1 weighing system elements are there fully reproduced. It will be understood therefore that the pouring ladle L with motor PM and the weighing platform W with support base B plus mounting 42—43 (flex plate or other) and transmitter bellows T as represented by FIG. 4 will in an actual installation be supplemented by the remaining weighing system elements of FIG. 1 and thus will form a part of the complete weighing system which FIGS. 1-2-3 show.

Such complete weighing system will in the FIG. 4 application to the centrifugal mold flask M' operate in the same manner as has already been described for the weighing system when the pouring ladle L thereof serves molds of the static type shown at M in FIGS. 1-2. Thus if each cylindrical casting 56 has the desired wall thickness when the quantity of molten metal poured from ladle L into rotatable mold flask M' is 30 pounds, each supply by holding ladle K of molten metal 18 into pouring ladle L will be automatically stopped by the weighing system when 30 pounds of that molten metal have been received by ladle L; and such stopping then results from pointer 28 of weighing recorder WR reaching the 30 pound indication and closing contacts 26 with accompanying arrest in the forward tilting of ladle K and return of that ladle to the upright position.

Such measured charge of metal (here assumed to be 30 pounds) now can be transferred from pouring ladle L into the rotatable mold flask M' of FIG. 4 (via spout S') by depressing the "fill mold" push button 14. It then starts the previously described sequence of actions which serve to tilt the FIG. 4 ladle L with accompanying emptying of its contents into mold M' and thereafter to reposition that ladle upright.

The FIGS. 1-4 load-cell type weighing system is enabled by our novel vibration dampening means to maintain each charge of molten metal received by ladle L at the predetermined desired weight (such as 30 pounds) even though the support base B and weigh platform W of the system are subjected to vibrations of the severe intensity encountered in the foundry installation earlier described. Such accurate and reliable control in the weight of metal charges delivered by pouring ladle L into the rotatable mold flask M' of FIG. 4 assures that each cylindrical casting 56 produced by that mold will have a wall thickness within the limits desired or specified.

Systems of Back Weighing Type Also Benefited

In FIG. 8 our novel vibration dampening means are shown as being applied to a load-cell electronic type of weighing system which is generally similar to the "forward" weighing system of FIG. 1 but which differs therefrom by being organized to operate on the "back" weighing principle. The term "forward" as used in the above sense means that instrument WR registers and indicates the amount of molten metal which is introduced into the FIG. 1 pouring ladle L from the holding ladle K; whereas the term "back" as used in the above sense refers to the fact that the instrument WR of FIG. 8 registers and indicates the quantity of molten metal 18 which is poured out of the FIG. 8 ladle K' into the sprue opening S of mold M being served by that ladle and which thus lessens the ladle weight instead of adding to it.

Said pouring ladle K' preferably is made large enough to contain a supply of molten metal that is sufficient to fill a number of the individual molds M; wherefore if each mold needs 30 pounds of metal to fill it then the weighing and pouring ladle K' may have a capacity of several hundred pounds or enough to fill ten or more of the molds M. Such molten metal as drawn from the cupola furnace (not shown) of the foundry installation can be delivered to ladle K' in any suitable manner as from a hoist car (not shown) suspended from an overhead rail track.

The aforesaid weighing and pouring ladle K' is carried by end trunnions 10' which normally hold it in the upright or level position indicated; but it also can be tilted forwardly for the purpose of pouring via spout 16' some of the molten metal 18' therein into the mold M when in front thereof or otherwise in receiving relation therewith. Such forwardly tilting movement is imparted to ladle K' by hydraulic motor PM' shown as being of the same cylinder type as the motor PM of FIG. 1.

Serving to carry this ladle K' of FIG. 8 and its tilting motor PM' is a weighing platform W' supported via member 40 on a transmitter bellows T (the diaphragm device T' of FIG. 10 may instead be used) and coordinated with a base B via the same flex plate mounting 42—43 as is used by the FIG. 1 system.

In FIG. 8 our novel vibration dampening means duplicate those earlier shown by FIG. 1. Thus they utilize a receiver bellows R (the diaphragm device R' of FIG. 10 may instead be used) hydraulically communicating via conduit 36 with the transmitter bellows T; also a leveler bellows D in branch conduit 45 plus a system fill valve F and a throttle valve V.

The FIG. 8 load cells C again are mounted in frame 34 and via bar 35 they receive from bellows R a mechanical force which duplicates the graviational force applied by weigh platform W' to transmitter bellows T via member 40. The electrical output signal from load cells C is fed via conductors 30 into bridge-amplifier circuits A, and the amplified output signal is transmitted from A via tare mechanism 58 to the winding 59 of weighing recorder WR'.

Said weighing instrument WR' is generally similar to the corresponding instrument WR of FIG. 1 but differs therefrom in that the pointer 28' thereof indicates the loss in weight of ladle K' which accompanies the pouring of molten metal therefrom out of spout 16'. This FIG. 8 instrument WR further is provided with the aforementioned tare mechanism 58 here illustratively shown as inserted between the amplifier A and the instrument winding 59 which receives the strengthened weight signals from that amplifier.

Also serving to determine the position of WR pointer 28' is a spring 60 the tension of which tends to move the top of pointer 28' forwardly (to the right in FIG. 8) along the instrument weight scale. This is in opposition to the solenoid plunger within winding 59 which tends to move the pointer top in the opposite direction (to the left in FIG. 8) to an extent dependent upon the energization intensity of that winding.

The tare mechanism 58 when activated serves to bring the WR' pointer 28' to the zero reading before the start of each pouring of molten metal out of ladle K' into a mold M. In the illustrative arrangement here shown such activation is governed by a limit switch contact 62 which closes upon return of the ladle K' to its represented untilted position at the end of each pouring operation. Such bringing of pointer 28' to the zero position prior to the beginning of the next pouring operation thus is accomplished automatically in a manner that being known to those skilled in the instrumentation art (see U.S. Patent 2,882,567 issued April 21, 1959, to Deakins et al.) will not be explained here.

Instead it will suffice to say that the closing of contact 62 upon each return of ladle K' to its untilted position causes mechanism 58 to operate in a way which automatically brings pointer 28' of weighing device WR' to the zero position in readiness for recording from zero the weight of the molten metal next to be poured out of ladle K' and into an empty mold M.

Attention will now be directed to the manner in which the complete system of FIG. 8 operates in performing its intended function of dispensing accurately weighed charges of molten metal from ladle K' into sprue openings S of foundry molds M that successively are brought into receiving relation with that ladle K'.

The cycle of automatic weighing and pouring is started by depressing a "fill mold" push button 25'. This causes control means 24' to activate pouring motor PM' in a way which forwardly tilts ladle K' with resultant pouring of molten metal 18' from spout 16' into the empty mold M. The metal thus transferred out of ladle K' lightens the total weight which is supported by transmitter bellows T. Since the force of said weight is reproduced in receiver bellows R and applied via bar 35 to the load cells C in frame 34, such transfer of metal decreases the energization of the WR' winding 59 and allows spring 60 to move the top of pointer 28' to the right away from zero.

Such advancement of pointer 28' along the WR' weight scale continues as more and more molten metal is poured from ladle K' into mold M. When a predetermined quantity of such metal (here assumed to be 30 pounds) has been so transferred, pointer 28' reaches the 30 pound mark on the WR' scale and closes contacts 26' (the support 48 therefor having previously been set at 30 pounds). That closure of WR' contacts 26 causes control means 24' to stop the forward tilting of ladle K' and by reversing hydraulic motor PM' then returns ladle K' to its represented untilted position.

Such return of ladle K' closes contact 62 and activates the tare mechanism 58. This again causes instrument WR' to return its pointer 28' to zero in readiness for weighing a succeeding charge of molten metal as same later is poured out of ladle K'. The weighing and pouring system of FIG. 8 now is ready for another cycle which exactly duplicates the one just described.

By reason of the represented incorporation therein of our novel vibration dampening means this "back" weighing system of FIG. 8 is capable of accurate and reliable operation even though the support base B and weigh platform W' thereof are subjected to troublesome vibrations of the intense magnitude that have been encountered by us in the foundry installation earlier described.

This is because our hydraulic system including bellows T and R (or the FIG. 10 diaphragms T' and R') plus the interconnecting resilient conduit 36 with throttle valve V faithfully supplies to load cells C a mechanical force which duplicates the gravitational weight of platform W' but from which all vibrations present in base B and platform W' have effectively been dampened out. Moreover, any spring effects present in elements of this FIG. 8 system do not detract from weight indication accuracy because they are compensated for automatically by the system instrumentation.

*Vibration Absorption Modification of FIG. 9*

In either or both of the vibration-dampened weighing systems of FIGS. 1 and 8 the resilient rubber hose conduit 36 which interconnects the transmitter and receiver bellows T and R (or the corresponding hydraulic diaphragm devices T' and R' of FIG. 10) and the resilient branch conduit 45 communicating with the leveler bellows D may if desired be replaced by rigid metal-tube conduits such as are represented at 36' and 45' in FIG. 9 if those rigid conduits are supplemented by a gas accumulator shown at 38 in FIG. 9 as also being connected into the hydraulic system.

Confined within the upper portion of this accumulator 38 is a quantity of air or other gas 64 which due to its resiliency and compressiveness acts as a cushion for the oil or other fluid 65 in the hydraulic system and serves to absorb from said fluid any and all pressure fluctuations which are induced in said fluid by vibrations in the support base B or weigh platform W. Such vibration-induced fluctuations in fluid pressure are in consequence not transmitted through throttle valve V to the receiver bellows R (or the receiver diaphragm R' of FIG. 10) and in this way they are prevented from distorting or otherwise adversely affecting the output signal that is set up in load cells C by the weight-proportional pressure which said receiver bellows R (or diaphragm R') applies to those load cells.

This vibration dampening action by the cushioning device 38 of FIG. 9 thus is the same as what is accomplished by FIGS. 1 and 8 wherein the resiliency of rubber hose conduits 36 and 45 serves to absorb the vibration-induced fluctuations in fluid pressure before same are transmitted through valve V to the receiver bellows R (or to the diaphragm R' of FIG. 10).

In either organization said throttle valve V functions (as earlier mentioned) to limit the rate of fluid flow through conduit 36 (FIGS. 1 and 8) and conduit 36' (FIG. 9) to such an extent that shocks to the weigh platform W cannot objectionably overload the weighing system load cells C; and this same flow limiting action by valve V further serves to reduce the tendency for pressure changes in conduit 36 (or 36') to overshoot or hunt. The most effective adjustment for this valve V (or for an equivalent hose clamp when used in place thereof) is best determined by trial and error in each particular installation.

In some situations it may be desirable to adjust the extent to which the aforesaid vibration-induced pressure fluctuations are dampened out of or absorbed from the hydraulic fluid 65. With the FIG. 9 organization this can be done by varying the quantity of air or other gas 64 which the accumulator 38 confines above said fluid 65 in cushioning relation thereto.

To reduce such gas quantity a valve shown at 66 in FIG. 9 may be opened for the purpose of permitting some of the confined air 64 to escape, while to increase the quantity of gas inside of the accumulator 38 additional air may be injected therein (by suitable pressure means not shown) through this same valve 66. In this way the volume of cushioning gas 64 may be varied with resultant adjustment in the extent or effectiveness of vibration dampening.

*Bellows Units May Be Replaced by Diaphragm Units*

It already has been mentioned that load cells of the strain-gauge type shown at C go from zero to full load capacity upon being compressed through the exceedingly small range of about 0.005 to 0.015 inch; and due to this smallness of compression movement it becomes possible for our vibration-dampened weighing systems to operate satisfactorily when the transmitter and receiver belolws shown at T and R in FIGS. 1, 3, 4, 8 and 9 are replaced by hydraulic diaphragm units such as are represented at T' and R' in FIG. 10.

In this FIG. 10 organization the diaphragm R' in said receiver unit is illustrated as being of the same size as the diaphragm T' in said transmitter unit; and these two diaphragms are interconnected for hydraulic communication one with the other via the system fluid 65. The represented cup-like mounting 68 for each of these diaphragms serves to seal the engaged diaphragm edge against leakage of the confined fluid 65 (that is in pressure contact with the diaphragm's lower face) and at the same time permits free movement by the diaphragm center through an up and down distance considerably greater than the aforementioned 0.005 to 0.015 inch compression range for the load cells C.

Interconnection of these FIG. 10 transmitter and receiver diaphragm units T' and R' may be established either by the resilient rubber hose conduit 36 of FIGS. 1 and 8 (which also is represented in FIG. 10) or by the rigid metal tube conduit shown at 36' in FIG. 9. When such resilient conduit is used at 36 and 45 in FIG. 10, vibration dampening will of course be effected by the resiliency of the conduit itself (as in FIGS. 1 and 8); while when the FIG. 10 conduit is of the rigid metal tube 25 shown at 36' and 45' in FIG. 9, supplemental gas cushioning means as indicated at 38 in FIG. 9 also will be needed.

Because of the matching diaphragm sizes, the force which the FIG. 10 weigh platform W applies via member 40' upon the transmitter diaphragm T' is reproduced at the receiver diaphragm R' in like intensity and applied via bar 35 to the load cells C in frame 34'. Conductors 30 accordingly receive from those FIG. 10 load cells C an output signal which is proportional to the aforesaid force applied by the weigh platform W to the supporting transmitter unit therebeneath. A load-cell type weighing system using these FIG. 10 diaphragm units T' and R' thus is capable of the same operation as is a comparable weighing system when equipped with the hydraulic bellows units T and R of the earlier drawing views.

Said diaphragm-type hydraulic units T' and R' of FIG. 10 accordingly are equivalent to and interchangeable with the bellows-type hydraulic units T and R of the earlier drawing views, and vice versa. Each and both of such transmitter devices T and T' thus may properly be designated as a "hydraulic transmitter unit"; while each and both of such receiver devices R and R' may with similar accuracy properly be referred to as a "hydraulic receiver unit."

*Load Multiplication and Division Facilitated*

Load-cell electronic type weighing systems which incorporate the vibration dampening improvements of our invention can have their applied loads multiplied or divided at the point of indication much more readily than can comparable systems which do not incorporate our inventive improvements. This will become evident upon reference to FIGS. 11 and 12.

FIG. 11 typifies load multiplication and shows the system load cells C equipped with a receiver bellows unit Ra which is larger than the associated transmitter bellows unit T beneath the weigh platform W of the weighing system. Fluid pressure set up in the hydraulic elements (including conduit 36) by the smaller transmitter bellows T (of any of the earlier drawing views) by a given weigh platform load on said bellows T acts upon the greater top interior area of this enlarged receiver bellows Ra with resultant application to load cells C by Ra of a force which is greater than said weigh platform load.

This correspondingly intensifies (or multiplies) the load cell output signal at FIG. 11 conductors 30; whereby when such multiplied signal is amplified by circuits A (see FIGS. 1, 8, 9) and fed into the system weighing recorder WR it will cause said recorder to show a weight which is similarly multiplied. Obviously multiplication comparable to that just described by reference to FIG. 11 also can be achieved through use of an enlarged hydraulic receiver unit of the diaphragm type (FIG. 10).

FIG. 12 typifies load division and shows the system load cells C provided with a receiver diaphragm R" which is smaller than the associated transmitter diaphragm T' beneath the weigh platform W of the weighing system. Fluid pressure set up in the hydraulic elements (including conduit 36) by the larger transmitter unit T' of FIG. 10 (or T of any of the earlier drawing views) by a given weigh platform load on said unit T' (or T) acts upon the reduced area of this smaller receiver unit R" with resultant application to load cells C by R" of a force which is lower than said weigh platform load.

This correspondingly reduces (or divides) the load cell output signal at FIG. 12 conductors 30; whereby when such divided signal is amplified by circuits A (FIGS. 1, 8, 9) and fed into the system weighing recorder WR it will cause said recorder to show a weight which is similarly divided. Obviously division comparable to that just described by reference to FIG. 12 also can be achieved through use of a reduced-size hydraulic receiver unit of the bellows type (FIG. 9 and earlier views).

Load-cell electronic weighing systems of the prior art type illustrated by FIG. 6 include no hydraulic elements corresponding to the T—T' transmitter units or to the R—R' receiver units just discussed above; wherefore they are incapable of achieving weight multiplication or weight division through the above described changes in the relative sizes of such units.

Moreover, load-cell type weighing systems having these hydraulic transmitter units T—T' and receiver units R—R' incorporated therein in the unique way provided by us can be organized to summarize composite loads on either an additive or a subtractive basis far more readily and effectively than were such hydraulic elements not present in the systems.

With our so improved weighing systems, two or more loads can be summarized additively by arranging that the several hydraulic receiver units R or R' respectively responsive to those several loads all apply their weight-proportional forces in the same cell-compressive direction to a common bar 35 which impresses upon an associated set of load cells C the summation of those several so applied forces. The resultant load cell output signal at conductors 30 then will be proportional to the total of those several individual weight loads; and when amplified by circuits A and fed into instrument WR will cause that instrument to indicate said total weight.

In generally similar fashion, two loads (or more if desired) can with our improved weighing systems be summarized subtractively by arranging that the hydraulic receiver unit R or R' responsive to the greater of the two loads act through bar 35 upon a set of load cells C in the compression-increasing direction, and that the other receiver unit R or R' responsive to the lesser of the two loads simultaneously act upon the same bar 35 (and associated load cells C) in the opposite or compression-decreasing direction. The resultant load-cell output signal at conductors 30 then will be proportional to the difference between those two individual weight loads; and when amplified by circuits A and fed into instrument WR will cause that instrument to indicate said difference in weight.

*Additional Advantages of Our Invention*

In addition to the vibration dampening and other benefits already described, our invention permits the load cells C of the foundry installations earlier considered to be physically removed from beneath the weigh platform W (or W') upon which there is mounted the ladle L (or ladle K') that carries hot molten metal and that thus makes the prior art load-cell positioning (shown by FIGS. 6–7) highly undesirable due to the heat and the dirt and the inaccessibility which are incident to such FIG. 6 positioning. Load cells or strain gauges of the type herein shown at C are extremely delicate and they cost a great deal; moreover they are sensitive to heat and shock. Hence when such load cells C are mounted immediately beneath (as in FIGS. 6–7) a foundry ladle from which molten metal is poured, they are constantly being damaged and thus present a real problem with respect to maintenance.

However when the electronic weighing system wherein such load cells C are used incorporates the vibration dampening improvements of our invention it becomes not only possible but also more convenient and otherwise more desirable to mount these load cells C in a control room or at some other location which is physically removed from the system weigh platform W and support base B and hence no longer subject to the harmful and inconvenient environment of that prior art cell location.

Communication between the apparatus in such control room (including load cells C, receiver unit R or R', amplifier A, weighing recorder WR or WR') and the physically separated apparatus (including base B, transmitter unit T or T', weigh platform W) at the location of metal weighing and pouring is established in part by means of hydraulic conduits as the drawing views hereof indicate at 36 and 36' and in remaining part by means of electrical wiring as each of FIGS. 1 and 8 further indicate schematically. With these two different forms (hydraulic and electrical) of communicating elements available, our improved system makes it possible for remote operation control to be achieved with improved flexibility and greater ease.

Moreover, it will have become apparent from earlier description that these novel pneumatic vibration dampening means of our invention can readily be applied to existing installations of load-cell electronic type weighing systems as well as to new installations of such systems. The changes required to be made in such an existing installation are not complex (compare the inventively improved FIGS. 1 and 8 with the prior art FIG. 6) and the new elements required to be added thereto are simple and inexpensive as well as being reliable in their operation. Such wide adaptability has practical significance of a high order.

*Our Improved Weigh Platform Mounting of FIGS. 13–14*

Practical experience in operating weighing systems of the load-cell electronic type which FIGS. 1 through 12 depict has revealed that the severeness of service encountered in the foundry installations described creates a need for mounting and supporting the system weigh platform W via facilities which provide greater ruggedness and self protection than do the flex plate elements represented at 42—43 in each of FIGS. 1-2-3, 4, 8, 9 and 10.

More specifically, those flex plates 42—43 which extend between the base upright 41 and the platform member 40 (that rests upon and applies the platform weight to transmitter bellows T) are found to function satisfactorily for only a relatively short time after being placed in service beneath the pouring ladle L (or K' of FIG. 8) and beside the sand-filled mold M that receives a weighed quantity of molten metal from the ladle. Undesirably soon sand and dirt and even drops of molten metal are found to fall upon and around these exposed flex plates 42—43 with resultant blocking of free up-and-down movement by member 40 and the bellows top, which blocking ultimately becomes so great as to render the assemblage inoperative. At that point the flex plates may have to be replaced.

The new and improved platform mounting which we have perfected and which FIGS. 13 and 14 show eliminates the foregoing disadvantages and assures that the elements for supporting and guiding the weigh platform W will function reliably and dependably over months and years of operating time without shut down or trouble of any kind even in challenging environments such as the illustrated foundry weighing where dirt and molten metal and other adverse factors are regularly encountered.

Referring to FIGS. 13 and 14, the entire weight of platform W plus the pouring motor PM and the pouring ladle L with molten metal 18 therein is transmitted to the top of transmitter bellows T via a central weigh column shown at 40' in the form of a vertical tube; the two ends of this weigh column 40' are surrounded by and extend through openings of upper and lower flexible diaphragms 42' and 43' which hold column 40' in its represented vertical position while permitting free up and down movement thereof; and surrounding and enclosing said central column 40' and its said upper and lower guiding diaphragms 42' and 43' is an outer pipe shell 41'. Said diaphragms may be cut from thin sheets (1/32 inch thickness works well) of any suitable flexible material, either metallic or non-metallic. Laminated plastic impregnated fibre glass has proven to be one extremely satisfactory material for these diaphragms.

The lower end of said pipe shell 41' rests upon the upper end of a mating cylinder 70 which extends upwardly from stationary base B in the manner shown and within which is housed the transmitter bellows T. These two shell sections 70 and 41' are removably secured together by bolts 71; and the outer periphery of the lower flexible diaphragm 43' is secured therebetween in the manner indicated. In similar fashion the inner edge of this same lower flexible diaphragm 43' is secured by removeable bolts 72 between the lower end of weigh column 40' and the top of a member 73 which rests upon bellows T and via which all weight carried by column 40' is transmitted to the bellows.

A ring-like ledge 74 encircles and is welded to said weigh column 40' near its top; and the inner edge of the aforementioned upper flexible diaphragm 42' is secured between this ledge 74 and a mating column section 75 that extends upwardly therefrom in the manner shown. The outer periphery of this same upper diaphragm 42' is clamped between the top of the outer pipe shell or casing 41' and a cap member 76 detachably secured thereto by bolts 77.

The weigh platform W itself is bolted at 78 to an inverted cup member 79 which rests upon the top of the aforementioned column extension 75, where bolts 80 hold it in place over and in support deriving relation to the weigh column 40' of the mounting assemblage. Result is that the entire weight of platform W and of everything carried thereon is communicated by central column 40' and member 73 to the transmitter bellows T housed in the lower assemblage portion.

The range of vertical movement on the part of platform W and weigh column 40' is exceedingly short (a very small fraction of an inch at the most) in going from the empty-ladle condition to the full-ladle condition; and in order to limit the upper extreme of such possible vertical travel a stop member shown at 82 in FIG. 14 may be provided if desired. This particular stop 82 is bolted to the cap member 76 at the top of outer pipe shell 41'.

Extending downwardly from the bottom of weigh platform W is a protective skirt or dust shield 83 which surrounds the entire upper portion of pipe shell 41' in the manner shown and which prevents dirt or sand or drops of molten metal from coming into contact with the inverted cup 79 and associated moveable parts that are above the shell's top cap 76. All portions of the mounting assemblage which are below this skirt are likewise effectively sealed against entry of dirt and foreign matter by pipe shield 41' itself plus the mating cylindrical section 70 upon which the shell rests and to which it is bolted at 71.

The transmitter bellows T in the lower assemblage portion is shown by FIGS. 13–14 as communicating via hydraulic conduit 36 with the companion receiver bellows R of the weighing system. As illustrated by the left of FIG. 13, said receiver bellows R are housed within a mounting frame 34' and through bar 35 impress the platform W weighing force upon the stationarily supported load cells C. The basic functioning of this part of the system is the same as earlier explained for FIGS. 1, 8, 9 and 10; and for this reason further description thereof is deemed unnecessary.

For the purpose of permitting the FIGS. 13–14 weigh platform W to be properly leveled without use of any supplemental leveler bellows (corresponding to D in FIGS. 1, 8, 9, 10), the stationary side of the FIG. 13 bellows R bears against a rod 84 that is movable towards or away from the bellows under the action of a leveler adjusting screw 46'. Oil or other hydraulic fluid initially is filled into conduit 36 plus bellows T and R via valve F; after which filling that valve F is closed. Incident to such filling air trapped in bellows T ahead of the incoming fluid can be released therefrom by temporary removal of a bleeder cap 87.

With a given amount of hydraulic fluid thus admitted into the hydraulic system, the leveler screw 46' of FIG. 13 is adjusted until the top of bellows T of FIG. 14 is set for that desired vertical level wherein the flexible diaphragms 42' and 43' are substantially flat and undeflected in either the upward or the downward direction. Under this condition a pointer 85 extending from weight column 40' occupies the central or mid position represented. Through transparent plates 86 the position of this pointer 85 can be viewed from outside the pipe shell 41'.

The new weigh platform mounting just described has proven especially advantageous when utilized in load-cell electronic weighing systems of the vibration-dampened type earlier disclosed herein. It is however also useable with comparably practical benefit in other weighing systems, such as those wherein the load cells C are positioning directly beneath the weigh platform W in accordance with the prior art practice which FIGS. 6–7 depict.

In such an alternate utilization the transmitter bellows shown at T in FIG. 14 will of course be replaced by one or more of said load cells C that then will directly carry the weight of central tube 40' while being housed immediately thereunder in the mounting's protective cylindrical section 70; and all explained advantages of ruggedness and self protection and reliable operation will be just as available and beneficial in that non-vibration-dampened installation as they are in the vibration-dampened systems illustratively disclosed herein.

Relative to the latter systems, it will be obvious that the transmitter unit T of FIG. 14 may if desired be a diaphragm type device such as FIG. 10 depicts at T'; also that the receiver unit R of FIG. 13 likewise may if desired be a diaphragm type device such as FIG. 10 depicts at R'.

*Summary*

From the foregoing it will be seen that our novel hydraulic vibration dampening means and other inventive improvements for load-cell type electronic weighing systems are highly practical as well as being capable of wide application. Such improvements are therefore not to be restricted to the particular utilization or to the specific form here disclosed by way of illustration.

The present application replaces and is a continuation-in-part of an earlier application also entitled "Weighing Systems of Load-Cell Electronic Type With Vibration Dampening Means" which was filed by us on December 23, 1957, as U.S. Serial No. 704,822 and which was abandoned following our filing of this replacement application.

What we claim is:

1. A system for accurately weighing a mass of material wherein said mass and its environs are subjected to undesirable vibration, said system comprising a vessel adapted to receive the material to be weighed, a weigh platform capable of imparting a gravitational weight force supporting said vessel, a base underlying and supporting said platform and being subjected to vibration, means for transforming said gravitational weight force to a hydraulic force, said means comprising a hydraulic force transmitter supported by said base and being directly connected to said weight platform, a hydraulic force receiver located at a point remote from the area subjected to vibration, said receiver being shielded from said vibration, resilient means establishing a hydraulic connection between said transmitter and said receiver, fluid level compensating means connected to said hydraulic connection for regulating the amount of fluid in the system, strain gauge type load cell means positioned at said vibration-free point for transforming said hydraulic force to an electronic signal, means connecting said strain gauge load cell means to said hydraulic force receiver for effecting conversion of a hydraulic force to an electronic signal, signal amplifying means for intensifying the load cell output signal, and instrument means connected to said signal amplifier being activated by said amplified signal for providing an accurate indication of the total weight of said platform.

2. A system as recited in claim 1 wherein said hydraulic force transmitter and receiver means comprise compressible fluid chambers the walls of which are in the form of bellows.

3. A system as recited in claim 1 wherein said hydraulic force transmitter and receiver means comprise compressible fluid chambers one wall of which comprises a flexible diaphragm.

4. A system as recited in claim 1 wherein said fluid conducting means connecting said hydraulic force transmitter and receiving means comprises a rubber conduit.

5. A system as recited in claim 1 additionally comprising a material source, motor means operatively connected to said source for effecting transfer of material from said source to said vessel and a circuit connection interposed between said instrument and said motor means effecting cessation of transfer of material from said source to said vessel upon registration of a predetermined indication by said instrument, and control means connected to said vessel for effecting removal of material from said vessel upon cessation of transfer of material from said source to said vessel.

6. A system as recited in claim 1 additionally comprising weight responsive tare mechanism means interposed in said system between said signal amplifier and said instrument for indicating the initial load on said platform when the vessel is fully loaded and for effecting an initial reading on said instrument, control means operatively connected to said vessel effecting a removal of material from said vessel, a circuit connection means interposed between said instrument and said vessel for effecting cessation of removal of material from said vessel upon registration of a predetermined indication by said instrument and switch means actuated by said vessel upon removal of a predetermined amount of said material to activate said tare mechanism means.

7. A system as recited in claim 1 wherein said fluid level compensating means comprises a fluid chamber positioned in said hydraulic connection, said chamber being provided with bellows type collapsible walls whereby the volume thereof can be varied and screw means connected to the free end of the bellows for effecting a reduction in volume of said chamber and thereby the displacement of the fluid contained in said chamber into said hydraulic connection.

8. A system as recited in claim 2 wherein said fluid level compensating means comprises screw means connected to one end of the hydraulic force receiver bellows, said screw means being operable to compress the receiver bellows and thereby displace the fluid retained therein into the hydraulic connection.

9. A system as recited in claim 2 wherein said weigh platform and said hydraulic force transmitter are incorporated into a substantially integral unit said unit comprising a substantially vertical shell the base of which is mounted on said base which is subjected to vibration, mounting means within said shell at the base thereof on which said transmitter bellows is attached, opening means provided in the base of said shell to accommodate the hydraulic connection line, an axially movable central column telescopically received within said shell and extending beyond the open end thereof having one end attached to the free end of said transmitter bellows, the other end of said column supporting said weigh platform, axially spaced flex plates being attached to the inner wall of said shell and to said column whereby the central column is movably supported in a vertical position, skirt means attached to the underside of said weigh platform and surrounding said shell, shoulder means attached to the underside of said weigh platform providing an abutment, and stop means attached to the open end of said shell adapted to engage said shoulder means whereby the axial movement of said central column is limited.

10. A system as recited in claim 9 wherein level indicating means are provided in the platform-transmitter unit, said means comprising a pointer attached to said column and viewing means provided in said shell whereby the position of said pointer can be observed.

References Cited in the file of this patent

UNITED STATES PATENTS

| | | |
|---|---|---|
| 507,009 | Jackson | Oct. 17, 1893 |
| 669,391 | Hillenbrand | Mar. 5, 1901 |
| 1,214,745 | Beard | Feb. 6, 1917 |
| 1,446,439 | Lieberman | Feb. 20, 1923 |
| 1,458,920 | Troll | June 12, 1923 |
| 1,494,164 | Goldbeck | May 13, 1924 |
| 1,893,858 | Carlson | Jan. 10, 1933 |
| 2,244,334 | Hopkins | June 3, 1941 |
| 2,373,504 | Schlieben | Apr. 10, 1945 |
| 2,457,655 | Gifford | Dec. 28, 1948 |
| 2,536,628 | Denisoff | Jan. 2, 1951 |
| 2,561,318 | Ruge | July 17, 1951 |
| 2,564,221 | Hornfeck | Aug. 14, 1951 |
| 2,726,061 | Schieser | Dec. 6, 1955 |
| 2,767,975 | Horst | Oct. 23, 1956 |
| 2,772,569 | Ruge | Dec. 4, 1956 |
| 2,775,887 | Hines | Jan. 1, 1957 |
| 2,793,026 | Giardino | May 27, 1957 |
| 2,795,410 | Reynard | June 11, 1957 |
| 2,844,350 | Higham | July 22, 1958 |
| 2,932,501 | Hicks | Apr. 12, 1960 |

FOREIGN PATENTS

| | | |
|---|---|---|
| 1,135,318 | France | Dec. 17, 1956 |